(No Model.) 2 Sheets—Sheet 2.

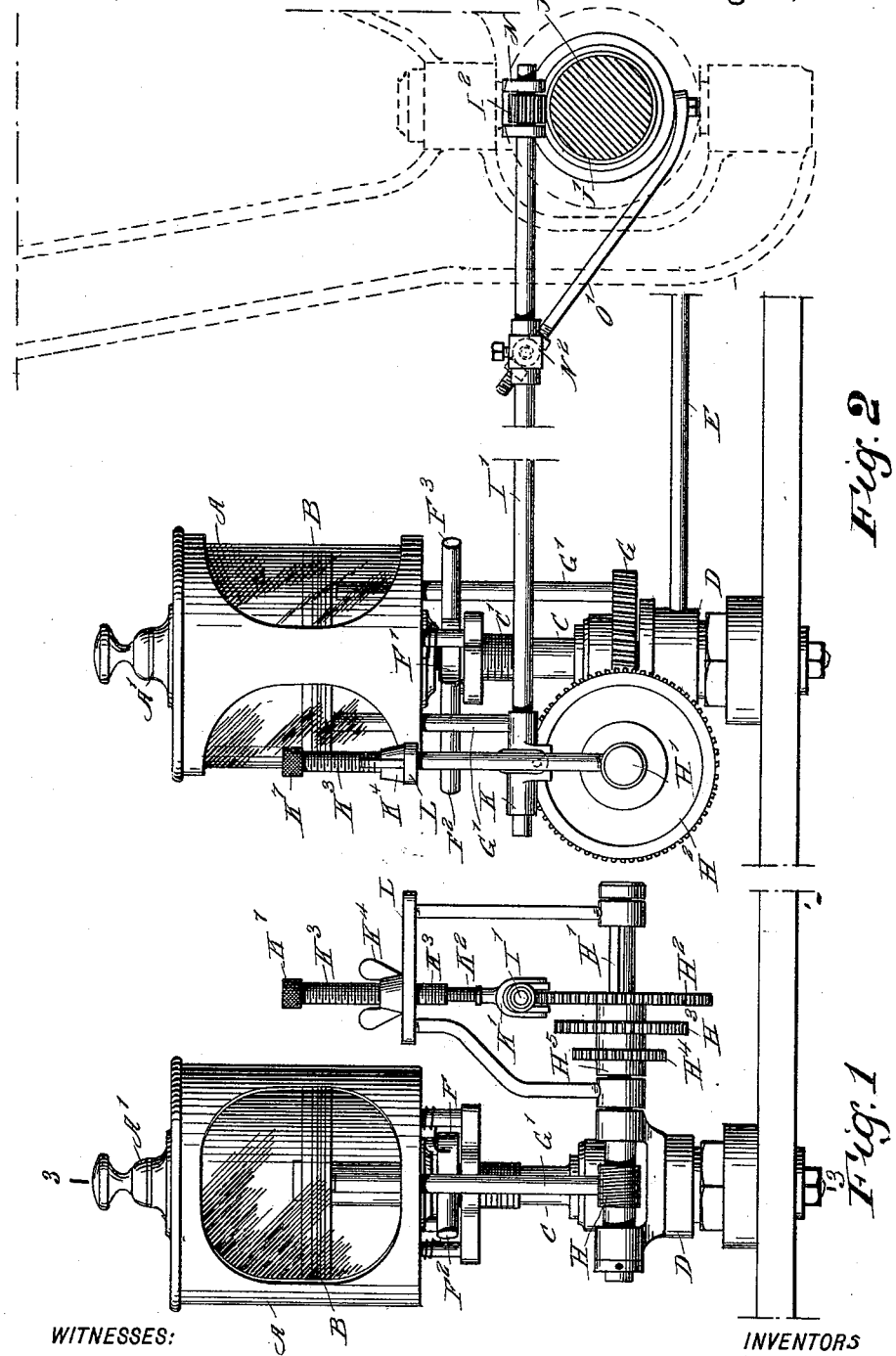

C. P. HOGUE & J. W. SMITH.
LUBRICATOR.

No. 544,173. Patented Aug. 6, 1895.

WITNESSES:
John A. Berghem
Theo. G. Hoster

INVENTORS
C. P. Hogue
J. W. Smith
BY Munn & Co
ATTORNEYS.

UNITED STATES PATENT OFFICE.

CHARLES P. HOGUE AND JOSEPH W. SMITH, OF PORTLAND, OREGON.

LUBRICATOR.

SPECIFICATION forming part of Letters Patent No. 544,173, dated August 6, 1895.

Application filed October 12, 1894. Serial No. 525,669. (No model.)

*To all whom it may concern:*

Be it known that we, CHARLES P. HOGUE and JOSEPH W. SMITH, of Portland, in the county of Multnomah and State of Oregon, have invented a new and Improved Lubricator, of which the following is a full, clear, and exact description.

The object of the invention is to provide a new and improved lubricator which is simple and durable in construction and arranged to uniformly and forcibly feed the desired amount of lubricant to the object to be lubricated.

The invention consists, principally, of a piston in a lubricant-containing vessel for forcing the lubricant out of the vessel to the object to be lubricated.

The invention also consists of certain parts and details and combinations of the same, as will be fully described hereinafter and then pointed out in the claims.

Reference is to be had to the accompanying drawings, forming a part of this specification, in which similar letters of reference indicate corresponding parts in all the figures.

Figure 6:
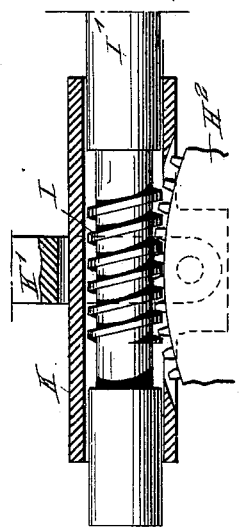
Figure 1:
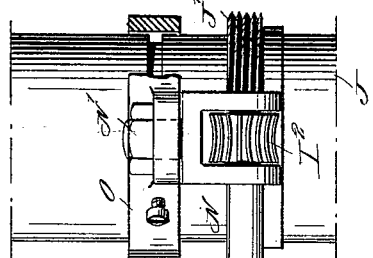
Figure 8:
Figure 4:
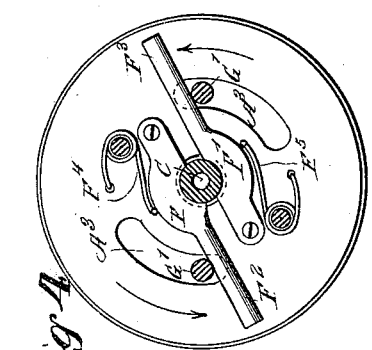
Figure 5:
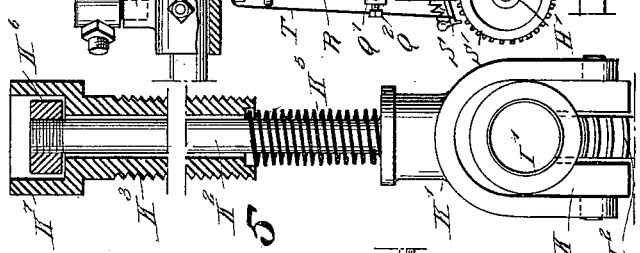
Figure 3:
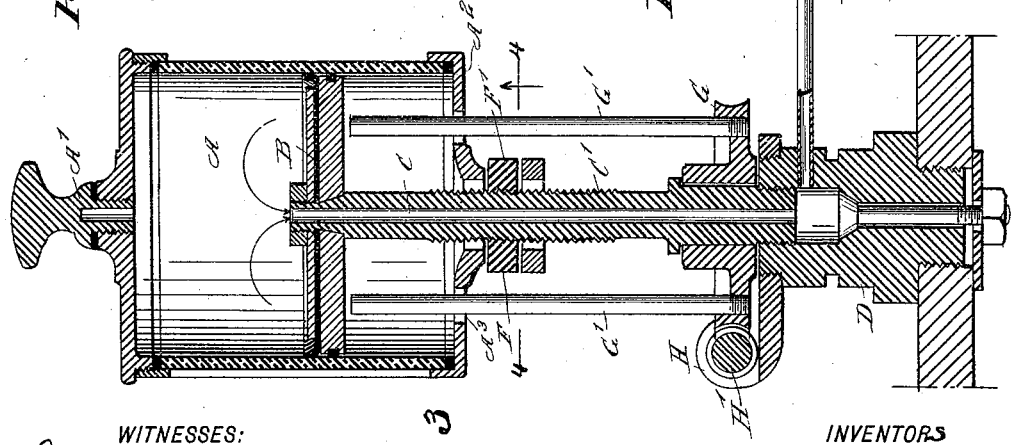

Figure 1 is an end elevation of the improvement. Fig. 2 is a side elevation of the same as applied. Fig. 3 is an enlarged sectional side elevation of the improvement on the line 3 3 of Fig. 1. Fig. 4 is an inverted sectional plan view of the same on the line 4 4 of Fig. 3. Fig. 5 is an enlarged cross-section of part of the driving mechanism. Fig. 6 is a sectional side elevation of the same. Fig. 7 is a plan view of part of the same with parts in section; and Fig. 8 is a side elevation of a modified form of the driving mechanism.

The lubricant is contained in a suitably-constructed vessel A, in which is arranged a stationary piston B, mounted in the upper end of a hollow stem C, attached to a base-piece D, supported in any desirable manner, and provided with a feed-pipe E for carrying the lubricant to the object to be lubricated. (See Fig. 3.) Now, it will be seen that when the vessel A is moved downward against the stationary piston B, then the lubricant contained in the vessel is forced through the hollow stem C into the feed-pipe E and to the object to be lubricated. A uniform movement is given to the vessel A to force the lubricant out of the vessel, as described, and this movement is preferably derived from the line-shaft or other object to be lubricated at its bearing. (See Fig. 2.) As illustrated in the drawings, the vessel A is moved downward against the stationary piston B, and the said vessel is provided on top with a feed-cap A' for refilling the vessel with the lubricant whenever necessary; but it is obvious that the piston B may be made movable and the vessel A stationary with good results.

On the under side of the bottom $A^2$ of the vessel A are pivoted the half-nuts F and F', provided with handles $F^2$ and $F^3$, respectively, and pressed on by springs $F^4$ and $F^5$, respectively, so as to hold the threads of the said half-nuts in contact with opposite sides of the threaded portion C' of the stem C. In the bottom $A^2$ of the vessel A are formed segmental slots $A^3$, engaged by vertically-disposed pins G', extending from a worm-wheel G upward to within a short distance of the under side of the piston B, as plainly shown in Fig. 3. Now when the worm-wheel G is rotated the pins G' will carry the vessel A around, and as the half-nuts F and F' are held on the vessel and in contact with the threaded portion C' of the stationary stem C the said vessel is moved downward and the lubricant is forced out of the vessel through the hollow stem C and feed-pipe E to the object to be lubricated.

The worm-wheel G is mounted to rotate loosely on the lower part of the stem C and is in mesh with the worm H, secured on a transversely-extending shaft H', journaled in suitable bearings attached to the base-piece D. On the shaft H' are arranged a series of graduated worm-wheels $H^2 H^3 H^4$, secured or formed on a common hub $H^5$, mounted to turn with and to slide on the shaft H', the latter being provided for this purpose with a keyway adapted to be engaged by a set-screw held in the hub $H^5$. Either of the gear-wheels $H^2 H^3 H^4$ is adapted to be engaged by a worm I, formed or secured on a longitudinally-extending shaft I', carrying a worm-wheel $I^2$ in mesh with a worm J', formed or secured on a line-shaft J; the bearing of which is to be lubricated by the lubricant passing through the feed-pipe E, as indicated in Fig. 2. The rear end of the shaft I' is journaled in a sleeve K, hung in a fork K', provided with an upwardlyextending pin K², fitted to slide in a threaded sleeve K³, screwing in a frame L, loosely supported on the shaft H', the said sleeve K³ being adapted to be fastened in place by a wing-nut K⁴, acting as a jam-nut on the frame L. (See Fig. 1.)

A spring K⁵ encircles the pin K² between the fork K' and the lower end of the sleeve K³, so that when the latter is screwed downward the spring K⁵ is compressed to securely hold the sleeve K³ with this end of the shaft I' in a lowered position to insure the worm I remaining in mesh with the worm-wheel H², H³, or H⁴. On the upper end of the pin K² is formed a head K⁶, held in an enlarged head K⁷ of the sleeve K³, so that when the latter is screwed upward in the frame L the pin K² is carried along, and consequently the fork K', with the sleeve K and this end of the shaft I', is lifted to move the worm I out of engagement with the respective wheel H², H³, or H⁴.

By the arrangement described the worm I may be readily moved in mesh with either of the said worm-wheels, it being understood, however, that the said worm-wheels are shifted on the shaft H' to bring the desired worm-wheel directly under or in alignment with the shaft I'. The forward end of the shaft I' is journaled in a bearing N, having a transversely-extending pivot N', mounted to turn in a projection formed on the sleeve O, held loosely on the line-shaft J, so that the shaft I' is free to swing when screwing the sleeve K³ up or down, as previously explained. In order to still further support the shaft I', a second bearing N² is provided engaged by a pivot O², projecting from a bracket O', attached to the sleeve O, the said bearing N² engaging the shaft I' between the bearing N and the sleeve K.

Now, when the several parts are in the position illustrated in the drawings and the line-shaft J is rotated, then the worm J' on the said line-shaft rotates the worm-wheel I² and consequently the shaft I', which by the worm I imparts a rotary motion to the worm-wheel H² and to the shaft H'. The rotary motion of the latter is transmitted by the worm H to the worm-wheel G, so that the pins G' turn the vessel A, as previously explained, to force the lubricant through the stem C to the feed-pipe E and from the latter onto the journal for the line-shaft J. Thus as soon as the vessel is rotated the lubricant is regularly and in measured quantities fed to the journal, and as soon as the rotary motion of the line-shaft ceases the feed of the lubricant also ceases.

We do not limit ourselves to the special mechanism described for imparting a rotary motion to the vessel A, and to cause the latter to move downward in the manner described, as other devices may be employed to accomplish the same purpose. The mechanism selected is in conformity with the construction of the part to be lubricated.

As shown in Fig. 8, the shaft P is formed with a crank-arm P' connected by a rod Q with a head Q' held adjustably on an arm R loosely fulcrumed on the shaft H', the said head Q' being adapted to be fastened in place on the said arm R by a set-screw Q², which, when loosened, permits of sliding the head to any desired position on the arm R to give the latter more or less swing when the shaft D is rotated. Near the lower or pivoted end of the arm R is fulcrumed a spring-pressed pawl S engaging a ratchet-wheel S' carried on the shaft H', so that when a swinging motion is given to the arm R then the pawl S on the forward stroke of the arm imparts a rotary motion to the ratchet-wheel S', the shaft H', worm H, and worm-wheel G to cause the pins G' to turn the vessel A. On the return stroke of the arm R the pawl S slides over the teeth of the ratchet-wheel S', so that an intermittent rotary motion is given to the shaft H' from the shaft P.

When it is desired to feed a large quantity of oil to the journal or other part to be lubricated, then the operator takes hold of the handles F² and F³ to open the half-nuts F and F' to permit of sliding the vessel A downward by hand, and to thus feed a large amount of oil to the stem C', feed-pipe E, and part to be lubricated. When the vessel A is emptied and consequently in a lowermost position, then the operator likewise opens the half-nuts F and F' to raise the vessel A and refills the same with the desired lubricant through the filling-cap A'.

Having thus fully described our invention, we claim as new and desire to secure by Letters Patent—

1. In a lubricator, the combination of a perforated vessel adapted to contain the lubricant and having an outlet therefor, a half-nut pivotally mounted on the vessel adjacent to the perforation therein, a piston in said vessel, a threaded stem for the piston passing through the perforation in the vessel and adapted to be engaged by the half-nut, a spring connected to the half-nut and adapted to hold the same normally into engagement with the stem of the piston, and means for simultaneously rotating the vessel and holding the half nut in engagement with the said stem, substantially as set forth.

2. A lubricator, comprising a vessel to contain the lubricant, having slots in its bottom, a piston fitted in the said vessel and provided with a screw threaded stem extending through the bottom of the vessel, half nuts mounted on the bottom of said vessel adjacent to the slots therein and engaging the threaded portion of the stem, and a worm wheel rotatably mounted on the stem and provided with pins extending through the slots in the bottom of the vessel, said pins being adapted when the worm wheel is rotated in one direction to engage the half nuts and hold the same in engagement with the screw threads of the piston stems, and when the worm wheel is rotated in the other direction to be disengaged from said half nuts, substantially as set forth.

3. In a lubricator, the combination of a vessel, adapted to contain the lubricant and provided with an outlet for the same, the shaft H' journaled adjacent to said vessel, means operated from said shaft for forcing the oil out of the vessel, a frame, a series of worm wheels, slidingly mounted on the shaft H', a shaft I' carried in the frame, and adapted to receive rotary movement from the part to be lubricated, a worm on shaft I' adapted for engagement with either of the series of worm wheels on shaft H', and means for adjusting said shaft I' in said frame to bring said worm into operative position, substantially as set forth.

4. In a lubricator, the combination of a perforated vessel adapted to contain the lubricant and having an outlet therefor, a half-nut pivotally mounted on said vessel adjacent to the perforation therein, a piston in the vessel, a threaded stem for the piston passing through the perforation in the vessel and adapted to be engaged by the half-nut, means for positively holding the half-nut into engagement with said stem when the vessel is rotated in one direction, and means for holding the half-nut elastically in engagement with the stem when the vessel is rotated in the reverse direction, substantially as set forth.

5. A lubricator comprising a vessel adapted to contain the lubricant and having an outlet therefor, a piston having a stem, reciprocal screw threads formed on adjacent parts of said stem and vessel, one of such parts being movable into and out of engagement with the other part, and having partial screw threads and being provided with means for elastically holding it in engagement with the other at all times, means for imparting rotary movement to one of said parts, and means for simultaneously holding such parts positively in engagement, substantially as set forth.

6. In a lubricator, the combination of a vessel adapted to contain a lubricant and provided with a central opening, a piston located in the vessel, a screw threaded stem for the piston passing through the central opening in the vessel, a half nut pivoted on the vessel and adapted to engage the screw threaded stem, a wheel rotatably mounted adjacent to the vessel, and a pin on the said wheel adapted, when the wheel is rotated in one direction to engage the free end of the half nut on the casing whereby the said half nut is held in engagement with the screw threaded stem, said pin being also adapted when the wheel is rotated in the other direction to be moved out of contact with the half nut, whereby said half nut is released, substantially as set forth.

CHARLES P. HOGUE.
JOSEPH W. SMITH.

Witnesses:
JAS. A. POLAND,
JOHN P. MILLER.